United States Patent
Kishimoto

(10) Patent No.: US 6,181,827 B1
(45) Date of Patent: Jan. 30, 2001

(54) IMAGE PROCESSING METHOD AND APPARATUS

(75) Inventor: Masaki Kishimoto, Kanagawa (JP)

(73) Assignee: Sony Corporation, Tokyo (JP)

( * ) Notice: Under 35 U.S.C. 154(b), the term of this patent shall be extended for 0 days.

(21) Appl. No.: 09/083,622

(22) Filed: May 21, 1998

(30) Foreign Application Priority Data

May 23, 1997 (JP) .................................................. 9-150442

(51) Int. Cl.⁷ ...................................................... G06K 9/38
(52) U.S. Cl. ......................... 382/252; 382/270; 358/455; 358/456
(58) Field of Search ................................ 382/232, 234, 382/252, 270; 358/455, 456, 457, 448

(56) References Cited

U.S. PATENT DOCUMENTS 5,271,070 * 12/1993 Truong et al. ...................... 382/234
5,521,989 * 5/1996 Fan ...................................... 382/270
5,553,165 * 9/1996 Webb et al. ........................ 382/252

* cited by examiner

*Primary Examiner*—Thomas D. Lee
(74) *Attorney, Agent, or Firm*—Philip M. Shaw, Jr.; Crosby, Heafey, Roach & May

(57) ABSTRACT

An image processing apparatus comprises an error diffusion processing section 10 for performing error diffusion processing with quantization levels of three or above on image data $x(i, j)$ for producing an output; and a second error diffusion processing section 20 for performing error diffusion processing with quantization levels of three or above on the data outputted from the first error diffusion section 10 for outputting image data $y(i, j)$. Quantization levels of three or above of the quantizer 22 in the error diffusion processing section 20 are determined to be desired value. Quantization levels of three or above of the quantizer 12 in the error diffusion processing section 10 are determined to be levels each between each neighboring two of the quantization levels of the quantizer 22, the minimum level of the image input data $x(i, j)$ and the maximum level of the image input data $x(i, j)$.

9 Claims, 12 Drawing Sheets

IMAGE PROCESSING METHOD AND APPARATUS

BACKGROUND OF THE INVENTION

1. Field of the Invention

The present invention relates to an image processing method and apparatus for reducing gradation levels of image data through performing an error diffusion process with multiple levels.

2. Related Prior Art

When an image with a multiple-level gradation obtained through a computer or an image input device, for example, is outputted through an image output device such as a printer with fewer gradation levels, the gradation levels of the image data must be reduced. Pseudo halftone representation has been utilized for maintaining the quality of an original image while reducing levels of gradation. Among several methods of the pseudo halftone representation, an error diffusion method capable of producing a high-quality image has been widely used for printers with two levels of output gradation, for example. A multiple-level error diffusion method with quantization levels of three or above has been offered for an image output device capable of representing gradation levels of three or above.

However, the quality of an image is reduced with the multiple-level error diffusion method with fewer quantization levels. For example, when tones of an original image are close to the quantization levels, texture variations are conspicuous and pseudo contours are produced. This is caused by an absence of a random pattern specific to the error diffusion method, which is partly found in an output image. When a tone of original image data is close to a quantization level, the output level is a single quantization level, causing an absence of a random pattern.

In order to effectively prevent image quality reduction due to texture variations, a method is known for superimposing a regular pattern or random noise on image data. However, the method increases errors in every gradation level in the original image data. This sacrifices the best feature of the error diffusion method for producing minimized errors. Consequently the texture of the regular pattern does not match the texture of the error diffusion method. Another problem is, for example, enhanced roughness in an image output.

A method has been proposed for step-by-step error diffusion processing with levels of two to three, then to five as disclosed in Hiroshi Ochi, "High Quality Multiple-level Error Diffusion Method using Gradation Level Processing", Proceeding of Image Electronics Institute, 24, 1, pp.10–17, 1995. However, it takes longer in performing computation required by the step-by-step processing. Another problem is that roughness is greater since four output levels or above may be used for representing a particular gradation level. A compensation process thereof is required, too.

A general principle of the error diffusion method will now be described in detail with reference to Hitoshi Takaie and Mitsuo Yae, "Gradation Conversion Technique of Digital Image Data with C", in Interface, August 1993, pp.158–171. Problems of the multiple-level error diffusion method will be described as well.

With the error diffusion method pseudo halftones are represented by modulating quantization errors into high frequencies to be less perceptible, considering a characteristic of human visual perception. FIG. 11 is a block diagram of an image processing apparatus for implementing the general error diffusion method. The image processing apparatus comprises: a subtracter 111 for subtracting output data of a filter 114 described below from image input data $x(i, j)$; a quantizer (shown as Q) 112 for quantizing output data of the subtracter 111 for outputting as image output data $y(i, j)$; a subtracter 113 for subtracting output data of the subtracter 111 from the image output data $y(i, j)$; and the filter 114 for filtering the output data of the subtracter 113 for outputting to the subtracter 111. In the figure, $e(i, j)$ represents a quantization error produced through quantization at the quantizer 112. Therefore the output data of the subtracter 113 is quantization error $e(i, j)$. Coordinates of two directions intersecting each other are represented by "i" and "j", respectively. The two directions will be referred to as the i direction and the j direction, respectively.

The filter 114 is a sort of linear filter. The transfer function thereof is determined to be $G(z_1, z_2)$. $z_1$ and $z_2$ are variables in z transformation in the i direction and the j direction, respectively. The overall configuration of the image processing apparatus in FIG. 11 is regarded as a two-dimensional delta-sigma modulation circuit. Therefore expression (1) below is given for the relationship of input and output in the image processing apparatus.

[Expression 1]

$$Y(z_1, z_2) = X(z_1, z_2) + H(z_1, z_2)\, E(z_1, z_2) \qquad (1)$$

In expression (1), $Y(z_1, z_2)$, $X(z_1, z_2)$ and $E(z_1, z_2)$ are values of z transformation of $y(i, j)$, $x(i, j)$ and $e(i, j)$, respectively. Transfer function $H(z_1, z_2)$ of a filter for modulating quantization error $E(z_1, z_2)$ is given by expression (2) below.

[Expression 2]

$$H(z_1, z_2) = 1 - G(z_1, z_2) \qquad (2)$$

The transfer function $H(z_1, z_2)$ indicates a high-pass filter of two-dimensional finite impulse response (FIR). The high-pass filter is a filter for modulating quantization errors which determines a modulation characteristic of quantization error $E(z_1, z_2)$ modulated to a higher frequency. In the following description filters indicated with transfer functions $H(z_1, z_2)$ and $G(z_1, z_2)$ are referred to as filter $H(z_1, z_2)$ and filter $G(z_1, z_2)$, respectively.

$G(z_1, z_2)$ is given by expression (3) below.

[Expression 3]

$$G(z_1, z_2) = \Sigma\Sigma G(n1, n2) z^{-n1} \qquad (3)$$

The first $\Sigma$ in expression (3) indicates a sum when n1 is from $-N_1$ to $M_1$. The second $\Sigma$ in expression (3) indicates a sum when n2 is from $-N_2$ to $M_2$. Each of $N_1$, $M_1$, $N_2$ and $M_2$ is a positive integer. A filter coefficient is given by $g(n1, n2)$ and a target pixel by $n1=0$ and $n2=0$.

Typical filters as examples of $g(i, j)$, the coefficient of $G(z_1, z_2)$ are given by expressions (4) and (5) below. The * in the expressions represents a target pixel where $g(0, 0)=0$.

[Expression 4]

$$g(i, j) : \begin{pmatrix} * & 7 \\ 3 & 5 & 1 \end{pmatrix} \Big/ 16 \qquad (4)$$

[Expression 5]

$$g(i, j): \begin{pmatrix} & & * & 7 & 5 \\ 3 & 5 & 7 & 5 & 3 \\ 1 & 3 & 5 & 3 & 1 \end{pmatrix} / 48 \qquad (5)$$

FIG. 12 shows a frequency characteristic of error modulation filter $H(z_1, z_2)$ using filter $G(z_1, z_2)$ given by expression (4). FIG. 13 shows a frequency characteristic of error modulation filter $H(z_1, z_2)$ using filter $G(z_1, z_2)$ given by expression (5). A greater absolute value of frequency indicates a higher frequency in FIG. 12 and FIG. 13. Filter $G(z_1, z_2)$ and filter $H(z_1, z_2)$ using filter $G(z_1, z_2)$ given by expression (4) are called filters of Floyd & Steinberg (referred to as Floyd's filter in the following description). Filter $G(z_1, z_2)$ and filter $H(z_1, z_2)$ using filter $G(z_1, z_2)$ given by expression (5) are called filters of Jarvis, Judice & Ninke (referred to as Jarvis' filter in the following description).

FIG. 14 is an image outputted through the error diffusion method with two levels applying a Floyd's filter to an image input of continuous tone. FIG. 15 is an image outputted through the error diffusion method with two levels applying a Jarvis' filter to an image input of continuous tone.

FIG. 12 indicates that gains are low in low frequencies and high in high frequencies for the Floyd's filter. As a result, a fine texture is obtained in the image outputted through the two-level error diffusion method as shown in FIG. 14. FIG. 13 indicates that gains are higher in some degree in low frequencies and low in high frequencies. As a result, a coarse but uniform texture is obtained in the image outputted through the two-level error diffusion method as shown in FIG. 15.

The problem of the multiple-level error diffusion method will now be described with reference to FIG. 16. FIG. 16 is an image outputted through the error diffusion method with five levels applying a Jarvis' filter to an image input of continuous tone as an example of image outputted through the multiple-level error diffusion method. As shown, when gradation levels of an original image are close to the intermediate quantization levels, texture variations are conspicuous and image quality is reduced in the image produced through the multiple-level error diffusion method of the prior art. This is caused by the absence of a random pattern specific to the error diffusion method, which is partly found in the output image. When a tone of the original image data is close to a quantization level, the error is small and the output level is the single quantization level and the result is the absence of the random pattern.

It is an object of the invention to provide an image processing method and apparatus for producing a high-quality image with a uniform texture and reduced roughness through the multiple-level error diffusion method.

SUMMARY OF THE INVENTION

An image processing method of the invention comprises a first error diffusion processing step and a second error diffusion processing step. The first error diffusion processing step performs error diffusion processing of quantization levels of three or above on image input data for producing an output. The image input data is quantized based on the quantization levels of three or above. A quantization error produced through the quantization is modulated so that the frequency of the error is higher than that before the modulation is performed. The second error diffusion processing step performs error diffusion processing of quantization levels of three or above on the output of the first error diffusion processing step for producing image output data. The output of the first error diffusion processing step is quantized based on the quantization levels of three or above including a level different from the quantization levels of the first error diffusion processing step. A quantization error produced through the quantization is modulated so that the frequency of the error is higher than that before the modulation is performed.

An image processing apparatus of the invention comprises a first error diffusion processing section and a second error diffusion processing section. The first error diffusion processing section has a first quantization means for quantizing image input data based on quantization levels of three or above and a first error modulation means for modulating a quantization error produced through the quantization performed by the first quantization means so that the frequency of the error is higher than that before the modulation is performed. The first error processing section performs error diffusion processing of the quantization levels of three or above on image input data using the first quantization means and the first error modulation means for producing an output. The second error diffusion processing section has a second quantization means for quantizing the output of the first error diffusion processing section based on quantization levels of three or above including a level different from the quantization levels of the first quantization means and a second error modulation means for modulating a quantization error produced through the quantization performed by the second quantization means so that the frequency of the error is higher than that before the modulation is performed. The second error diffusion processing section performs error diffusion processing of the quantization levels of three or above on the output of the first error diffusion processing section for producing image output data, using the second quantization means and the second error modulation means.

According to the image processing method of the invention, the image input data is quantized based on the quantization levels of three or above in the first error diffusion processing step. The quantization error produced through the quantization is modulated so that the frequency is higher than that before the modulation is performed. The error diffusion processing of the quantization levels of three or above is thus performed on the image input data to produce the output. In the second error diffusion processing step, the output data of the first step is quantized based on the quantization levels of three or above including a level different from those of the first step. The quantization error produced through the quantization is modulated so that the frequency is higher than that before the modulation is performed. The error diffusion processing of the quantization levels of three or above is thus performed on the output data of the first step to produce the image output data.

According to the image processing apparatus of the invention, the image input data is quantized based on the quantization levels of three or above by the first quantization means in the first error diffusion processing section. The quantization error produced through the quantization by the first quantization means is modulated by the first error modulation means so that the frequency is higher than that before the modulation is performed. The error diffusion processing of the quantization levels of three or above is thus performed on the image input data to produce the output. In the second error diffusion processing section, the output data of the first error diffusion processing section is quantized by the second quantization means based on the quantization levels of three or above including a level different from that of the first quantization means. The quantization error produced through the quantization by the second quantization means is modulated by the second error modulation means so that the frequency is higher than that before the modulation is performed. The error diffusion processing of the quantization levels of three or above is thus performed on the output data of the first error diffusion processing section to produce the image output data.

The foregoing and other objectives, features and advantages of the invention will be more readily understood upon consideration of the following detailed description of certain preferred embodiments of the invention, taken in conjunction with the accompanying drawings.

DETAILED DESCRIPTION OF THE PREFERRED EMBODIMENT

Figure 1:
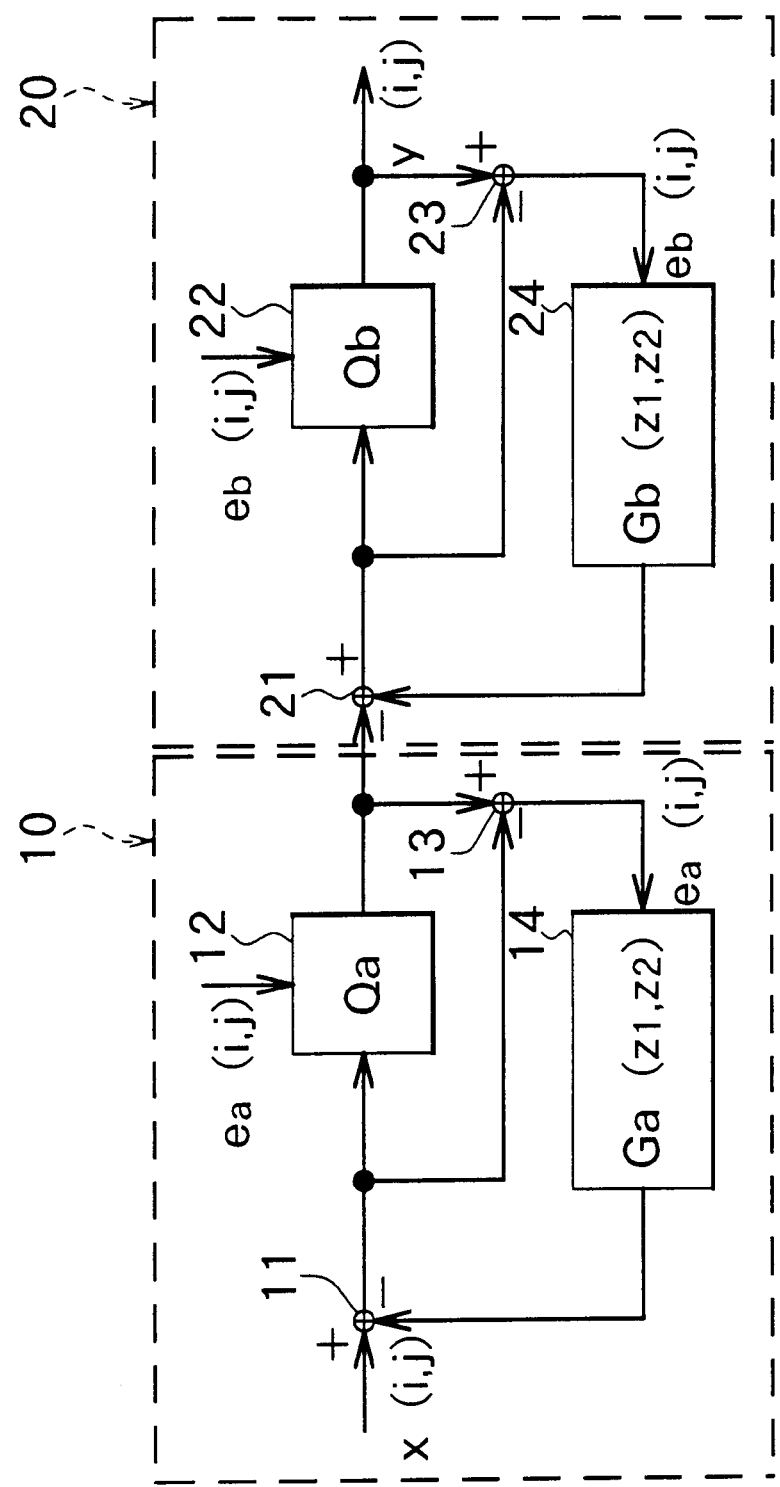
FIG. 1 is a block diagram of the image processing apparatus of the first embodiment of the invention.

Embodiments of the invention will now be described in detail with reference to the accompanying drawings. FIG. 1 is a block diagram of an image processing apparatus of a first embodiment of the invention. The image processing apparatus comprises a first error diffusion processing section 10 for performing error diffusion processing with quantization levels of three or above on image input data $x(i, j)$ for producing an output and a second error diffusion processing section 20 for performing error diffusion processing with quantization levels of three or above on the data outputted from the first error diffusion section 10 for producing image output data $y(i, j)$ The first error diffusion processing section 10 comprises: a subtracter 11 for subtracting output data of a filter 14 described below from image input data $x(i, j)$; a quantizer (shown as Qa) 12 for quantizing the output data of the subtracter 11 based on quantization levels of three or above for outputting as output data of the first error diffusion processing section 10; a subtracter 13 for subtracting the output data of the subtracter 11 from the output data of the quantizer 12; and the filter 14 for performing a filtering process on the output data of the subtracter 13 for outputting to the subtracter 11. In the figure, $e_a(i, j)$ represents a quantization error produced through quantization at the quantizer 12. Therefore the output data of the subtracter 13 is quantization error $e_a(i, j)$ The filter 14 is a sort of linear filter. The transfer function thereof is determined to be $G_a(z_1, z_2)$. The filter 14 may be implemented by a digital filter, for example.

The second error diffusion processing section 20 comprises: a subtracter 21 for subtracting output data of a filter 24 described below from the output data of the first error diffusion processing section 10; a quantizer (shown as Qb) 22 for quantizing the output data of the subtracter 21 based on quantization levels of three or above including levels different from those of the quantizer 12 for producing image output data $y(i, j)$; a subtracter 23 for subtracting the output data of the subtracter 21 from the output data of the quantizer 22; and the filter 24 for performing a filtering process on the output data of the subtracter 23 for outputting to the subtracter 21. In the figure, $e_b(i, j)$ represents a quantization error produced through quantization at the quantizer 22. Therefore the output data of the subtracter 23 is quantization error $e_a(i, j)$. The filter 24 is a sort of linear filter. The transfer function thereof is determined to be $G_b(z_1, z_2)$. The filter 24 may be implemented by a digital filter, for example.

Each of the error diffusion processing sections 10 and 20 is regarded as a two dimensional delta-sigma modulation circuit. Therefore expression (6) below is given for the relationship of input and output in the image processing apparatus shown in FIG. 1.

[Expression 6]

$$Y(z_1, z_2) = X(z_1, z_2) + H_a(z_1, z_2) \, E_a(z_1, z_2) + H_b(z_1, z_2) \, E_b(z_1, z_2) \quad (6)$$

In expression (6), $Y(z_1, z_2)$, $X(z_1, z_2)$, $E_a(z_1, z_2)$ and $E_b(z_1, z_2)$ are values of z transformation of $y(i, j)$, $x(i, j)$, $e_a(i, j)$ and $e_b(i, j)$, respectively. Transfer functions $H_a(z_1, z_2)$ and $H_{b(z1}, z_2)$ of the filters for modulating quantization errors $E_1(z_1, z_2)$ and $E_b$) are given by expressions (7) and (8) below.

[Expression 7]

$$H_a(z_1, z_2) = 1 - G_8(z_1, z_2) \quad (7)$$

[Expression 8]

$$H_b(z_1, z_2) = 1 - G(z_1, z_2) \quad (8)$$

The transfer functions $H_a(z_1, z_2)$ and $H_b(z_1, z_2)$ indicate high-pass filters of two-dimensional finite impulse response (FIR). The high-pass filters are filters for modulating quantization errors which determine modulation characteristics of quantization errors $E_a(z_1, z_2)$ and $E_b(z_1, z_2)$ modulated to higher frequencies. In the following description, filters indicated with transfer functions $H_a(z_1, z_2)$, $H_b(z_1, z_2)$, $G_a(z_1, z_2)$ and $G_b(z_1, z_2)$ are referred to as filters $H_a(z_1, z_2)$, $H_b(z_1, z_2)$, $G_a(z_1, z_2)$ and $G_b(z_1, z_2)$, respectively.

$G_a(z_1, z_2)$ and $G_b(z_1, z_2)$ are given by expressions (9) and (10) below, respectively.

[Expression 9]

$$G_a(z_1, z_2) = \Sigma\Sigma g_a(n1, n2) z^{-n1} z^{-n2} \quad (9)$$

[Expression 10]

$$G_b(z_1, z_2) = \Sigma g_b(n1, n2) z^{-n1} z^{-n2} \quad (10)$$

The first $\Sigma$ in expression (9) indicates a sum when n1 is from $-n_3$ to $M_3$. The second $\Sigma$. indicates a sum when n2 is from $-n_4$ to $M_4$. Similarly, the first $\Sigma$ in expression (10) indicates a sum of n1 from $-n_5$ to $M_5$. The second $\Sigma$ indicates a sum of n2 from $-n_6$ to $M_6$. Each of $N_3$, $M_3$, $N_4$, $M_4$, $N_5$, $M_5$, $N_6$ and $M_6$ is a positive integer. Filter coefficients are given by $g_a(n1, n2)$ and $g_b(n1, n2)$ and target pixels by n1=0 and n2=0.

Figure 2:
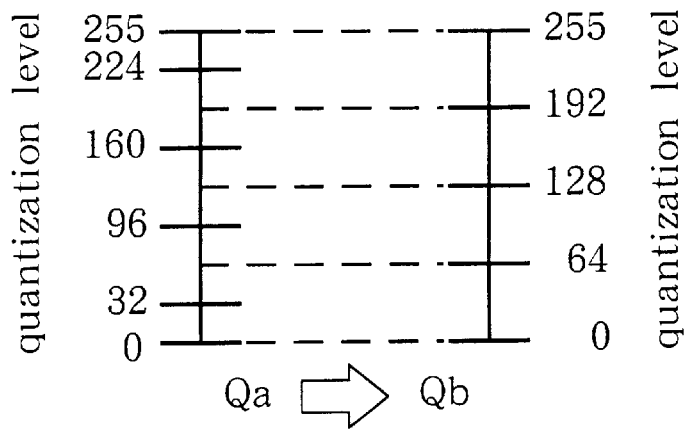
FIG. 2 is an illustration of examples of quantization levels for the quantizers in FIG. 1.

Quantization levels of three or above of the quantizers 12 and 22 both include a minimum level and a maximum level of image input data x(i, j) and quantization levels between the minimum and maximum levels. Quantization levels between the minimum and maximum levels of the quantizer 12 and those of the quantizer 22 are alternately determined. In the embodiment in particular, quantization levels of three or above of the quantizer 22 are determined to be suitable for obtaining image output data y(i, j) as a final output. Quantization levels of three or above of the quantizer 12 are determined to be levels each between a neighboring two of the quantization levels of the quantizer 22, the minimum level of the image input data x(i, j) and the maximum level of the image input data x(i, j) FIG. 2 shows an example of quantization levels of the quantizers 12 and 22. In the example, image input data x(i, j) has 256 levels of gradation from "0" to "255". In order to obtain image output data (i, j) of five levels as a final output, quantization levels of the quantizer 22 are determined to be "0," "64", "128", "192", and "255". Quantization levels of the quantizer 12 are determined to be levels each between neighboring two of the quantization levels of the quantizer 22, the minimum level of the image input data x(i, j) and the maximum level of the image input data x(i, j), that is "0", "32", "96", "160", "224" and "255".

Characteristics are determined to be different between error modulation filter $H_a(z_1, z_2)$, in the first error diffusion processing section 10 and filter $H_b(z_1, z_2)$ in the second error diffusion processing section 20. In this case, it is preferable that error modulation filter $H_b(z_1, z_2)$ provides higher gains in low frequencies than error diff-usion filter $H_a(z_1, z_2)$. A design of filters $H_a(z_1, z_2)$ and $H_b(z_1, z_2)$ will be described in detail later.

An operation of the image processing apparatus of the embodiment will now be described. The description applies to the image processing method of the embodiment as well. Image input data x(i, j) is inputted to the first error diffusion processing section 10. Data outputted from the filter 14 is then subtracted from the image input data x(i, j) at the subtracter 11. Data outputted from the subtracter 11 is quantized at the quantizer 12. Data outputted from the quantizer 12 is then inputted to the second error diffusion processing section 20 as data output of the first error diffusion processing section 10. Data outputted from the subtracter 11 is subtracted from data outputted from the quantizer 12 at the subtracter 13. Quantization error $e_a(i, j)$ is thus produced. Quantization error ea(i, j) as data outputted from the subtracter 13 is inputted to the filter 14 where a filtering process is performed represented by transfer function $G_a(z_1, z_2)$. Data outputted from the filter 14 is inputted to the subtracter 11. Through the operation, quantization is performed at the first error diffusion processing section 10 on image input data x(i, j) based on quantization levels of three or above. Quantization error $e_a(i, j)$ produced through the quantization is then modulated to a higher frequency. The error diffusion processing with quantization levels of three or above is thus performed on image input data x(i, j) for producing an output.

Data outputted from the first error diffusion processing section 10 is inputted to the second error diffusion processing section 20. Data outputted from the filter 24 is subtracted from the data outputted from the first error diffusion processing section 10 at the subtracter 21. Data outputted from the subtracter 21 is quantized at the quantizer 22. Data outputted from the quantizer 22 is produced as data outputted from the second error diffusion processing section 20, that is, data y(i, j) outputted from the image processing apparatus. Furthermore, the data outputted from the subtracter 21 is subtracted from the quantizer 22 at the subtracter 23 to produce quantization error $e_b(i, j)$. Quantization error $e_b(i, j)$ as data outputted from the subtracter 23 is then inputted to the filter 24 where a filtering process is performed represented by transfer function $G_b(z_1, z_2)$. Data outputted from the filter 24 is inputted to the subtracter 21. Through the operation, quantization is performed at the second error diffusion processing section 20 on the data outputted from the first error diffusion processing section 10 based on quantization levels of three or above. Quantization error $e_b(i, j)$ produced through the quantization is then modulated to a higher frequency. The error diffusion processing with quantization levels of three or above is thus performed on the data outputted from the first error diffusion processing section 10 for producing an output.

As described so far, the image processing apparatus of the embodiment provides the two-step error diffusion processing for input data x(i, j) at the error diffusion processing sections 10 and 20 with the quantizers 12 and 22 and the filters 14 and 24 whose characteristics vary from each other. Image output data y(i, j) with reduced levels of gradation is finally obtained.

Figure 3:
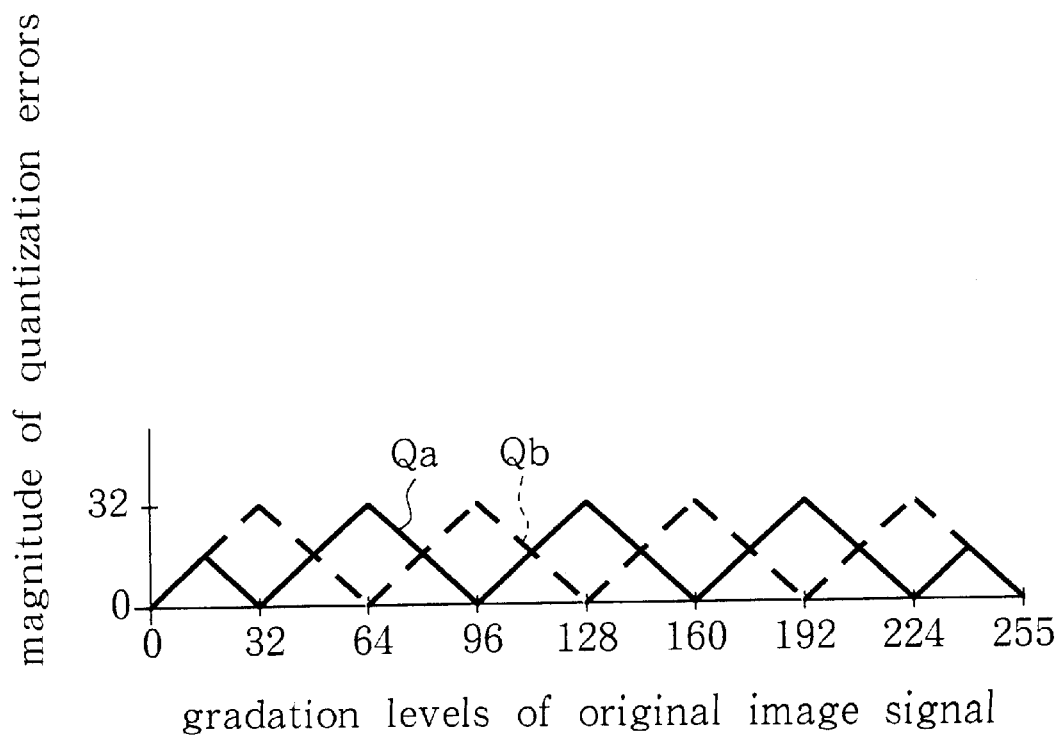
FIG. 3 is an illustration of magnitudes of quantization errors produced at the quantizers in FIG. 1 for the gradation levels of image data input where the quantization levels of the quantizers are determined as shown in FIG. 2.

The effects of the image processing apparatus of the embodiment will now be described. FIG. 3 shows the magnitudes of quantization errors produced at the quantizers 12 and 22 for gradation levels of image input data x(i, j) where quantization levels of the quantizers 12 and 22 are determined as shown in FIG. 2. In FIG. 3 a solid line shown with $Q_a$ indicates magnitudes of quantization errors produced at the quantizer 12. A broken line shown with $Q_b$ indicates magnitudes of quantization errors produced at the quantizer 22. As shown, the original quantization at the quantizer 22 does not produce errors near the quantization levels. Consequently random patterns are not produced near the quantization levels. The quantizer 12 therefore performs quantization for selectively applying errors to parts where errors are not produced through quantization performed at the quantizer 22. Such a two-step quantization performed at the quantizers 12 and 22 achieves uniform quantization errors for all the gradation levels of the original image data.

A design of error diffusion filters $H_a(z_1, z_2)$ and $H_b(z_1, z_2)$ in the error diffusion processing sections 10 and 20 will now be described. If filters with the same characteristics are used for filters $H_a(z_1, z_2)$ and $H_b(z_1, z_2)$, interference of frequencies occurs between quantization errors produced at the first stage and those at the second stage, according to expression (6). Image quality is thus reduced. It is therefore preferable that filters with different characteristics are used for filters $H_a(z_1, z_2)$ and $H_b(z_1, z_2)$. Since errors produced at the first stage are not uniform yet as shown in FIG. 3, a texture is not produced near the quantization levels of the quantizer 12. In contrast, quantization errors produced at the second stage are uniform and a texture produced from filter $H_b(z_1, z_2)$ is thus dominant over all the gradation levels of the original image data. Therefore a uniform texture is achieved through designing such that filter $H_a(z_1, z_2)$ produces a fme texture and filter $H_b(z_1, z_2)$ produces a coarse texture. This owes to the human visual perception which is more sensitive to a coarse texture. In order to allow filter $H_a(z_1, z_2)$ to produce a fme texture and filter $H_b(z_1, z_2)$ to produce a coarse texture, gains in high frequencies are increased for filter $H_a(z_1, z_2)$ while gains in low frequencies are increased for filter $H_b(z_1, z_2)$ compared to filter $H_a(z_1, z_2)$.

Comparisons will now be made among a Floyd's filter of high gain in high frequencies used for filter $H_a(z_1, z_2)$ and three kinds of filters H1 to H3 each used for filter $H_{b(z1, z_2)}$. Expressions (11) to (13) are given below for filter coefficients of the three kinds of filters $G_b(z_1, z_2)$ corresponding to filters H1 to H3. The * in the expressions indicates a target pixel where $g_b(0, 0)=0$.

[Expression 11]

$$gb(i, j): \begin{pmatrix} * & 9 & 5 \\ 3 & 7 & 9 & 7 & 3 \\ 1 & 3 & 5 & 3 & 1 \end{pmatrix} / 56 \qquad (11)$$

[Expression 12]

$$g(i, j): \begin{pmatrix} * & 5 & 5 \\ 3 & 5 & 5 & 5 & 3 \\ 1 & 3 & 5 & 3 & 1 \end{pmatrix} / 44 \qquad (12)$$

[Expression 13]

$$gb(i, j): \begin{pmatrix} * & 0 & 5 \\ 3 & 7 & 0 & 7 & 3 \\ 0 & 3 & 5 & 3 & 0 \end{pmatrix} / 36 \qquad (13)$$

Figure 4:
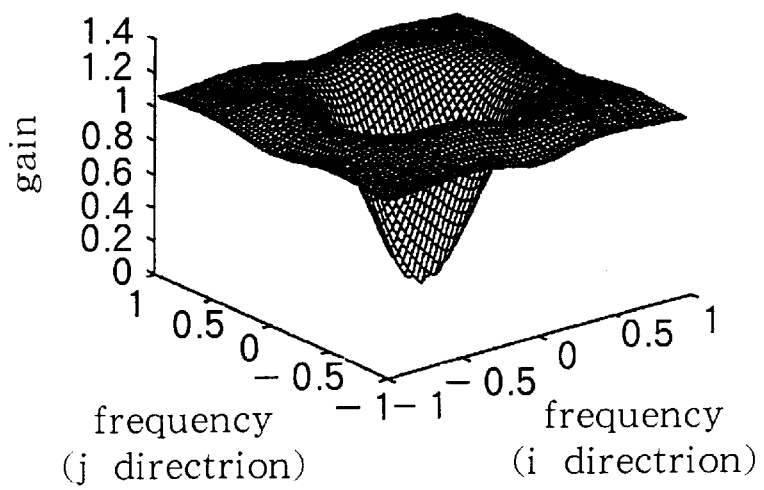
FIG. 4 is a plot for showing the example of frequency characteristic of the filter used in the second error diffusion processing section in FIG. 1.
Figure 5:
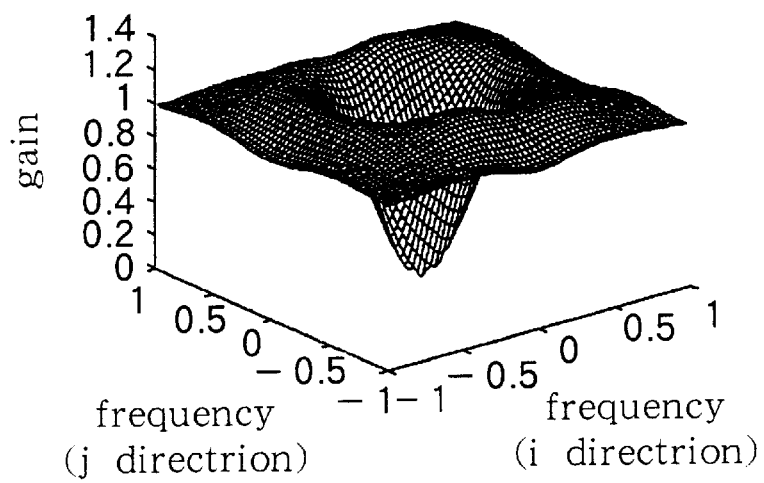
FIG. 5 is a plot for showing the other example of frequency characteristic of the filter used in the second error diffusion processing section in FIG. 1.
Figure 6:
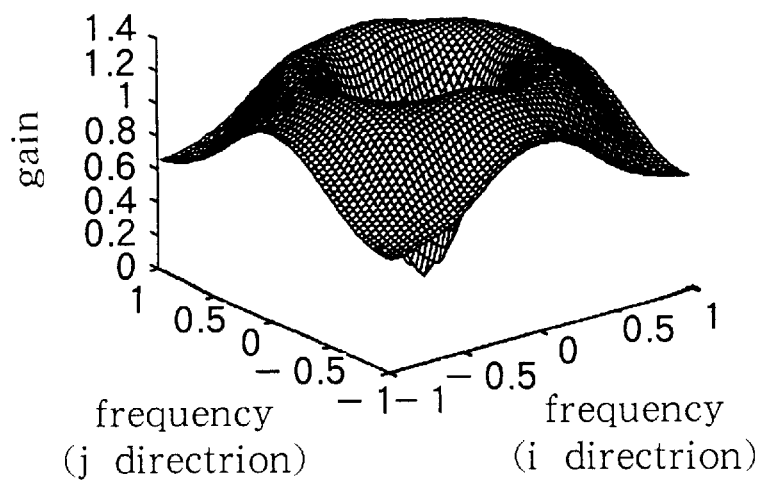
FIG. 6 is a plot for showing still the other example of frequency characteristic of the filter used in the second error diffusion processing section in FIG. 1.

FIG. 4 to FIG. 6 show frequency characteristics of the error modulation filters H1 to H3 using the three kinds of filters $G_b(z_1, z_2)$ given by expressions (11) to (13), respectively. A greater absolute value of frequency indicates a higher frequency in FIG. 4 to FIG. 6.

Figure 7:
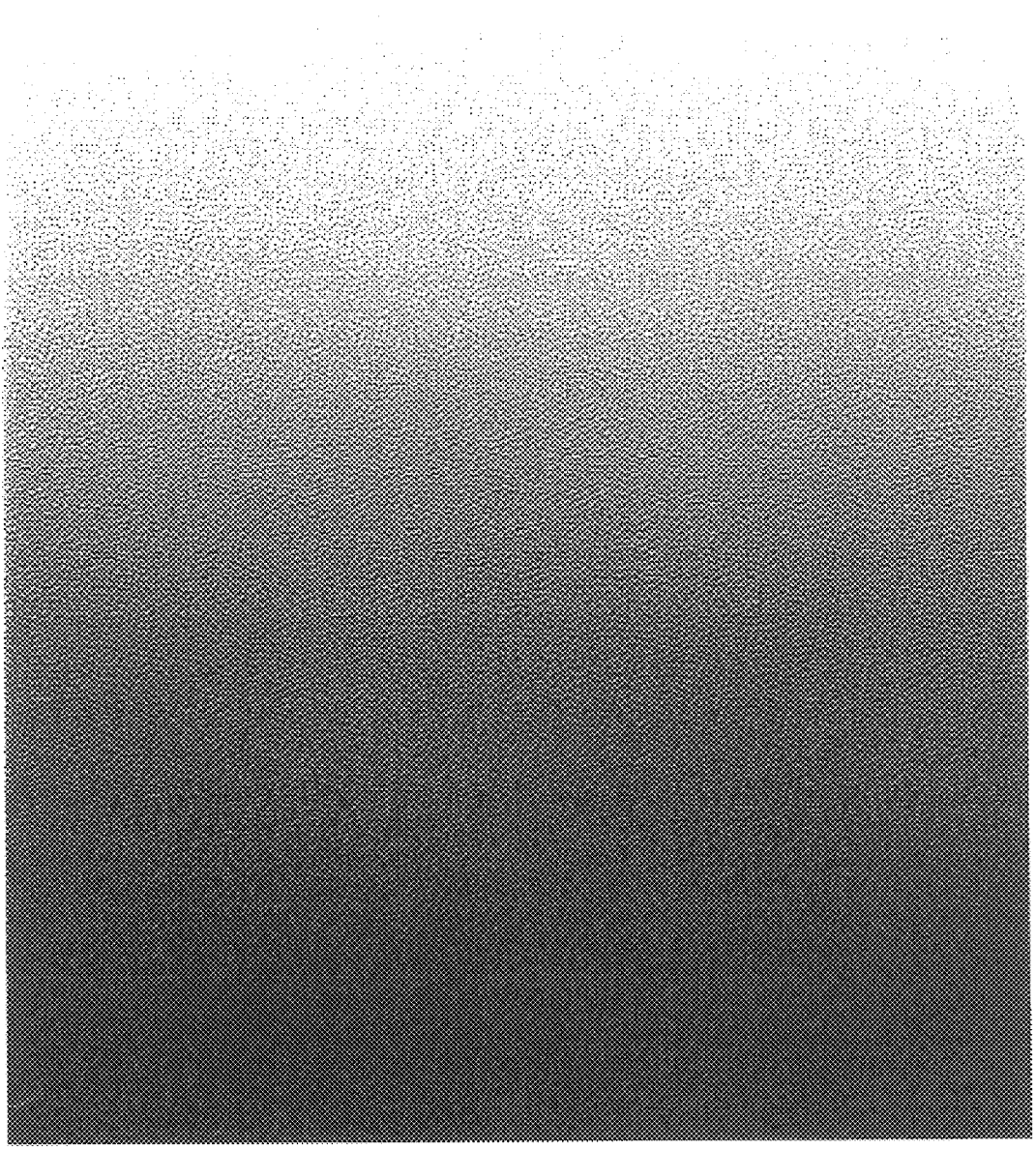
FIG. 7 is the output image of five levels obtained through the image processing apparatus in FIG. 1 with the filter corresponding to FIG. 4.
Figure 8:
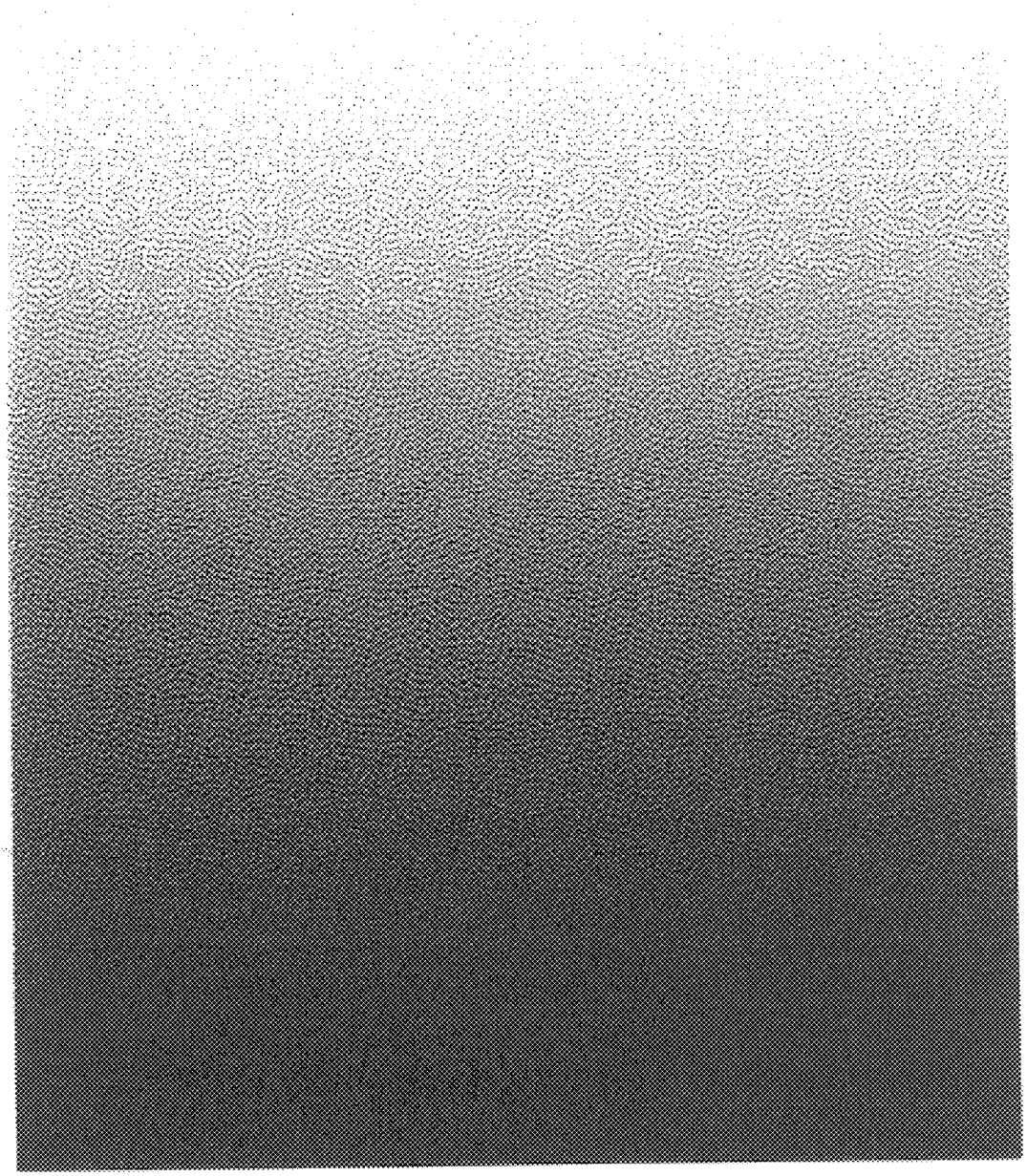
FIG. 8 is the output image of five levels obtained through the image processing apparatus in FIG. 1 with the filter corresponding to FIG. 5.
Figure 9:
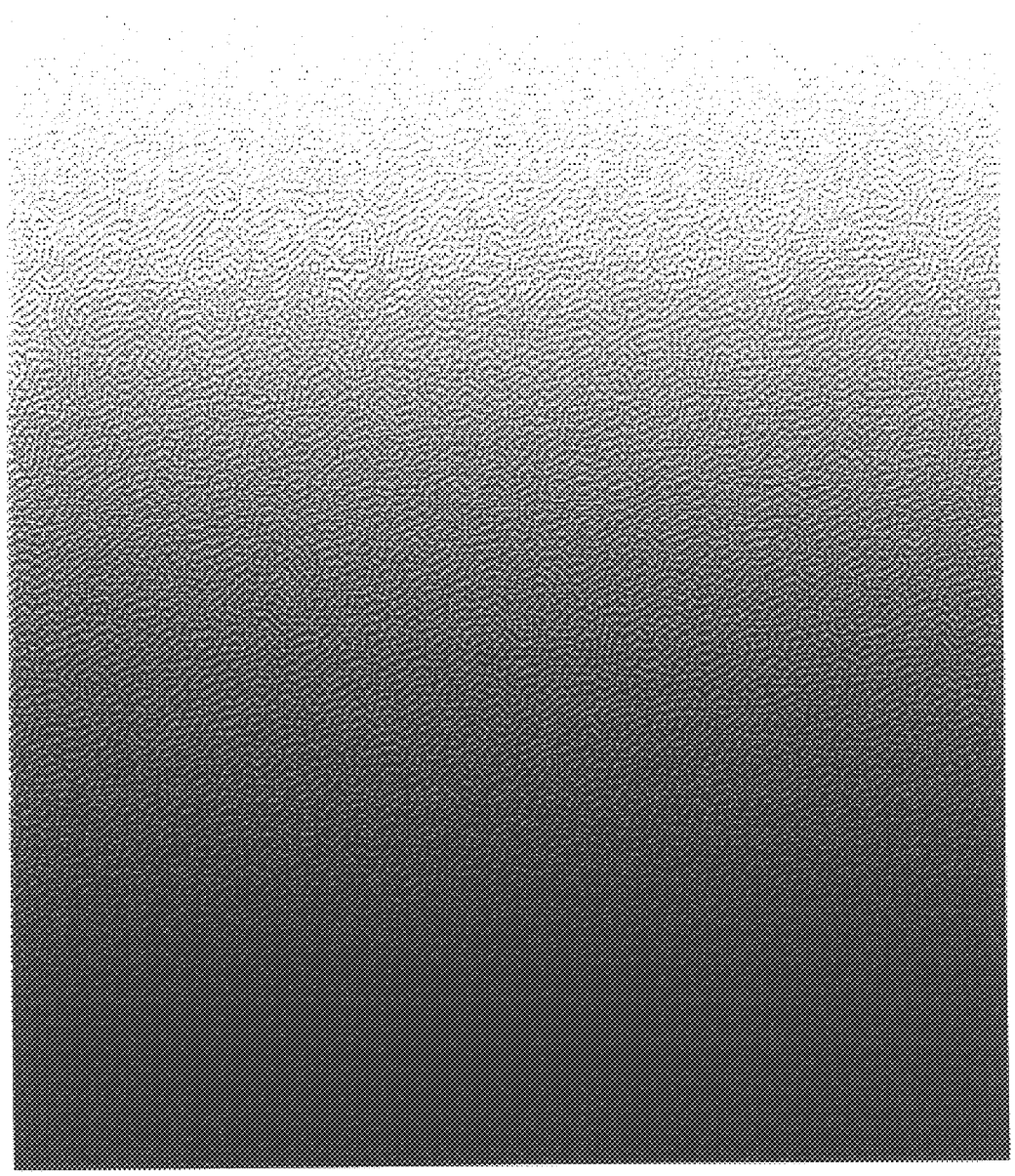
FIG. 9 is the output image of five levels obtained through the image processing apparatus in FIG. 1 with the filter corresponding to FIG. 6.
Figure 12:
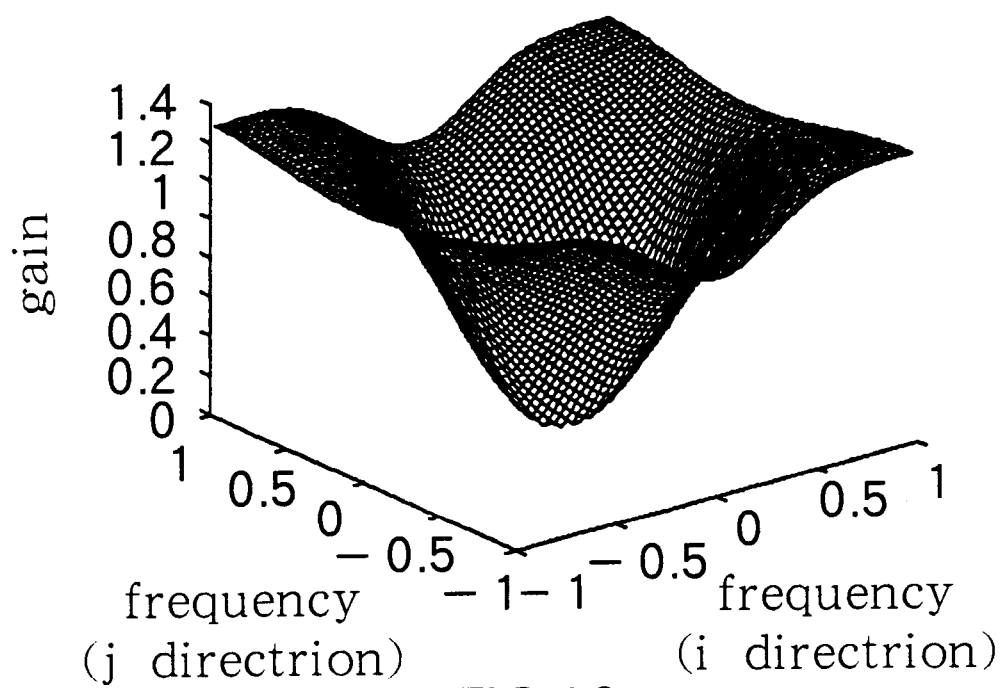
FIG. 12 is a plot for showing the example of frequency characteristic of the filter used in the image processing apparatus in FIG. 11.

FIG. 7 to FIG. 9 are images represented with five levels outputted through the two-step error diffusion method applied to an image input of continuous tone where Floyd's filter (as given by expression (4) and shown in FIG. 12) is used for filter $H_a(z_1, z_2)$ and the three kinds of filters H1 to H3 each corresponding to FIG. 4 to FIG. 6, respectively, are used for filter $H_b(z_1, z_2)$.

FIG. 4 to FIG. 7 indicate that gains are low in high frequencies for any of the three kinds of filters H1 to H3 used for filter $H_b(z_1, z_2)$ compared to the FloydTs filter used for filter $H_a(z_1, z_2)$ Among the three filters, filter H1 obtains higher gains in high frequencies while filter H3 obtains higher gains in a slightly lower frequency band. As a result, a fme texture is obtained with filter H1 and a coarse texture is obtained with filter H3 as shown in FIG. 7 to FIG. 9.

Figure 13:
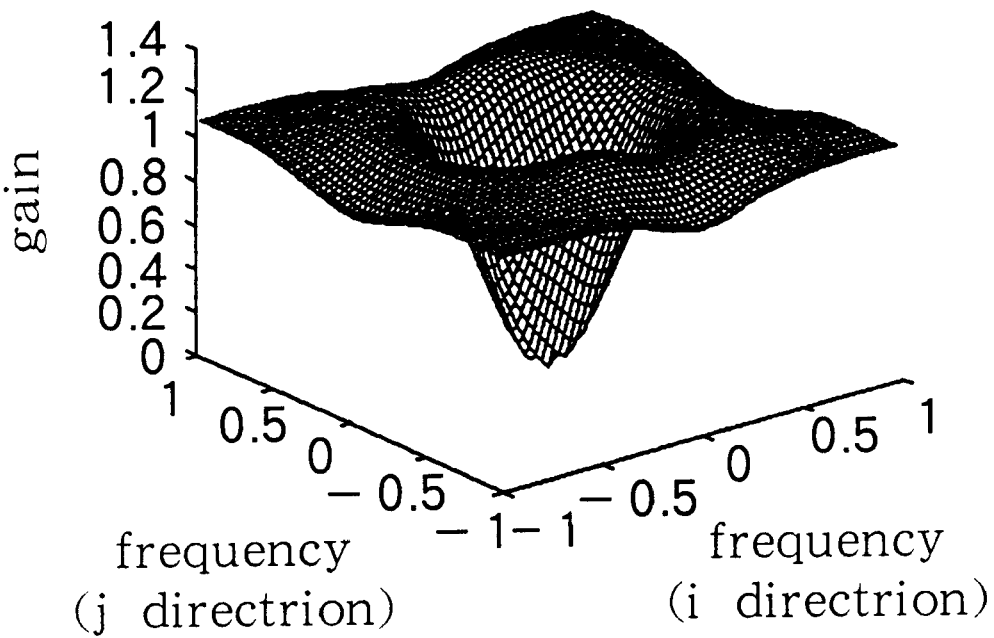
FIG. 13 is a plot for showing the other example of frequency characteristic of the filter used in the image processing apparatus in FIG. 11.
Figure 14:
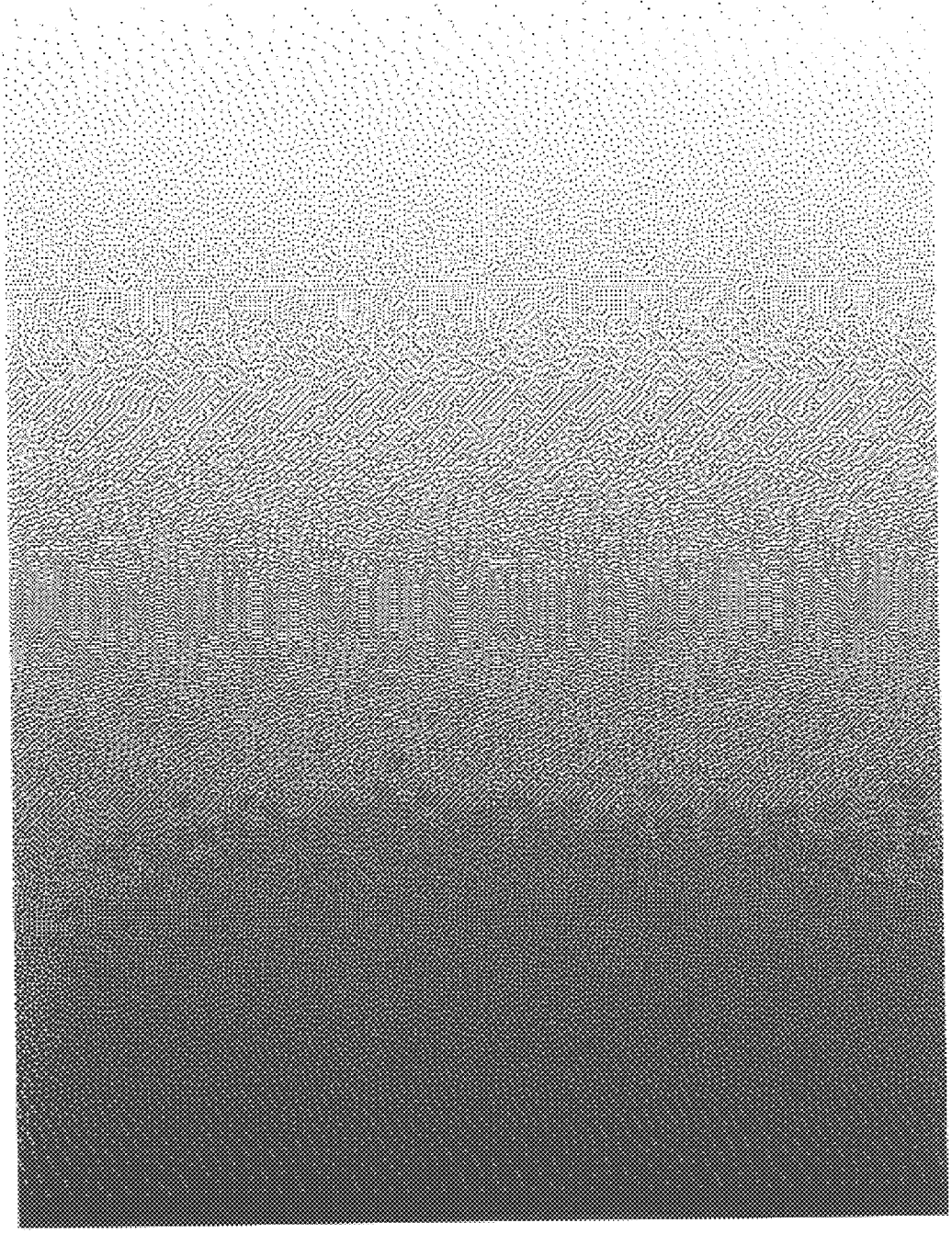
FIG. 14 is the output image obtained through the two-level error diffusion processing with the filter corresponding to FIG. 12.
Figure 15:
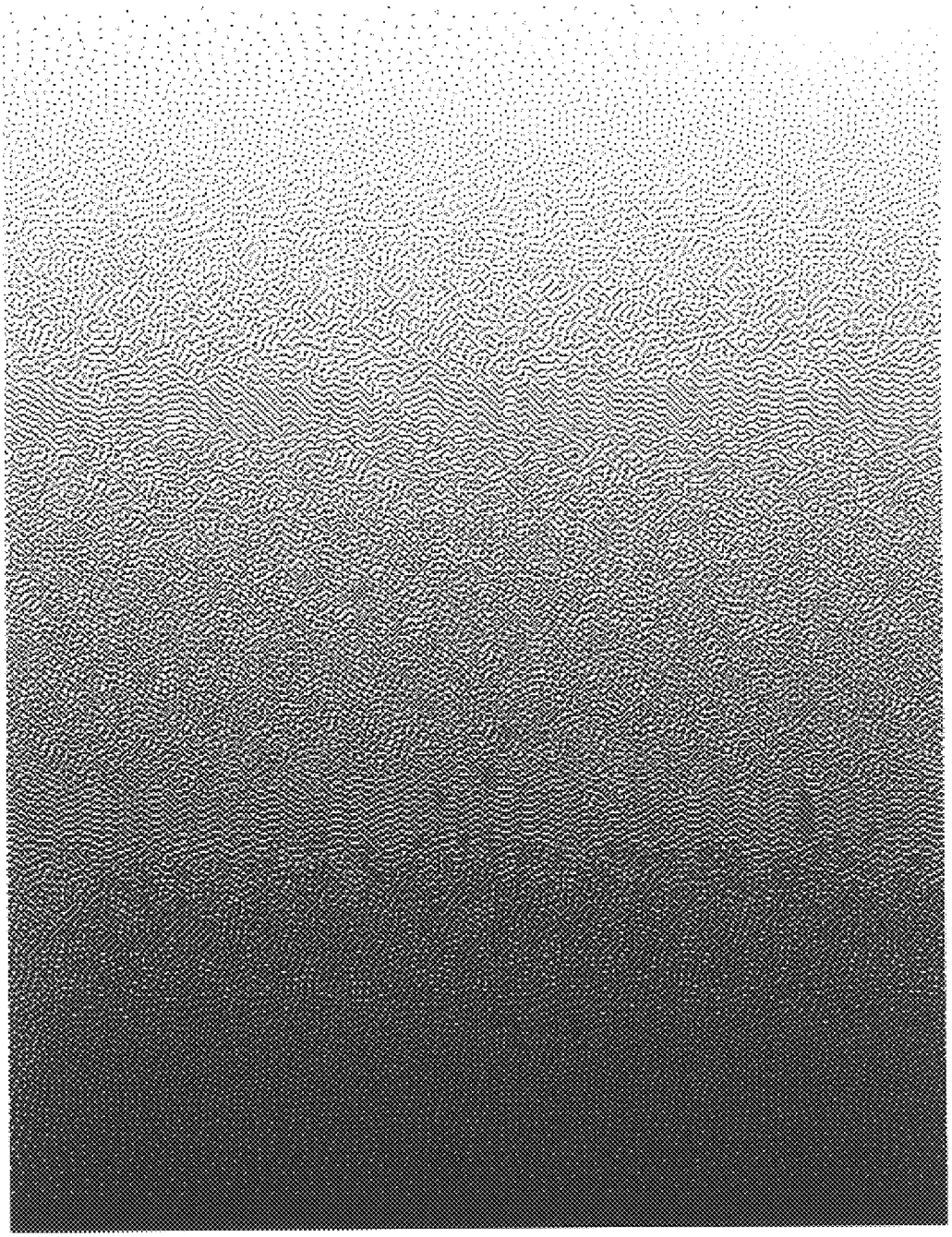
FIG. 15 is the output image obtained through the two-level error diffusion processing with the filter corresponding to FIG. 13.
Figure 16:
FIG. 16 is the output image obtained through the five-level error diffusion processing with the filter corresponding to FIG. 13.

FIG. 7 shows that interference occurs since the frequency characteristic of filter H1 is similar to that of the Floyd's filter used for filter $H_a(z_1, z_2)$. As shown in FIG. 9, filter H3 produces a uniform texture with reduced interference. Since a fme and uniform texture improves image quality, it is required to select a filter used for $H_b(z_1, z_2)$ best suited to characteristics and resolution of output equipment. As shown in FIG. 8, a texture of intermediate quality between those shown in FIG. 7 and FIG. 9 is obtained with filter H2 as shown in FIG. 5, having an intermediate characteristic between those of filters H1 and H3. If a Jarvis' filter (as given by expression (5) and shown in FIG. 13) is used for $H_b(z_1, z_2)$, a texture of intermediate quality between those shown in FIG. 7 and FIG. 8 is obtained since the Jarvis' filter has an intermediate characteristic between those of filters H1 and H2.

Through comparisons between FIG. 16 and FIG. 7 to FIG. 9, it is noted that the image processing apparatus and method of the embodiment improve texture variations near quantization levels where there is normally a problem found in the multiple-level error diffusion method of the related art. Consequently a uniform texture is obtained using the present invention. A texture finally obtained through the embodiment is produced through superimposing a texture of the filter used for $H_{b(zi, z2)}$ on a texture of the filter used for $H_a(z_1, z_2)$. It is additionally noted that the embodiment does not add errors more than are necessary and a gradation level of the original image data is thus represented with two or three output levels. As a result, a high-quality image output with reduced roughness is obtained through the multiple-level error diffusion method.

The embodiment of the invention provides effects for the five-level method similar to those of the three-level method. With quantization levels increasing up to seven and nine, the difference is reduced between the images outputted through the embodiment and those through the related-art error diffusion method.

In the embodiment as described so far, the first stage of error diffusion processing is performed, using quantization levels each placed between neighboring two of the original quantization levels of three or above. As a result, random patterns are superimposed around the original quantization levels. Next, the second stage of error diffusion processing is performed, using the error modulation filter with a characteristic different from that of the filter used in the first stage. An image output is thus produced with a uniform texture.

The first stage of error diffusion processing in the embodiment may be regarded as a process of superimposing noises on the original image data. However, the noises superimposed are different from regular patterns or random noises used in related arts. Instead, the superimposed noises are those depending on the original image data with fewer effects on low frequencies in the original image data. The noises are selectively added to a part where errors are not produced by the original quantization so that the noises do not increase the maximum value of error. In the image output, roughness is thus reduced and output levels widely different from the original image data are not included. Therefore the embodiment allows a high-quality image output to be obtained through the multiple-level error diffusion method.

As thus described, the embodiment achieves a high-quality image output having a uniform texture and reduced roughness without pseudo contours and graininess.

In the embodiment the quantization levels of the first stage of error diffusion processing are determined to be levels each between a neighboring two of the quantization levels of the second error diffusion processing, the minimum level of the image input data and the maximum level of the image input data. As a result, the embodiment allows uniform quantization errors over all the gradation levels of the image input data.

In the embodiment, the modulation characteristics for quantization errors are different between the first and second stages of error diffusion processing. As a result, interference is prevented between quantization errors produced in the first stage of error diffusion processing and those produced in the second stage. An image of higher quality is thus achieved. Particularly in the embodiment, the modulation characteristic for quantization errors of the second stage of error diffusion processing is determined so that gains are higher in low frequencies, compared to the first stage. An image with a more uniform texture is thus obtained.

The image processing apparatus of the embodiment may be either provided as a single unit or incorporated in an image output device such as a printer in a form of integrated circuit and the like.

Figure 10:
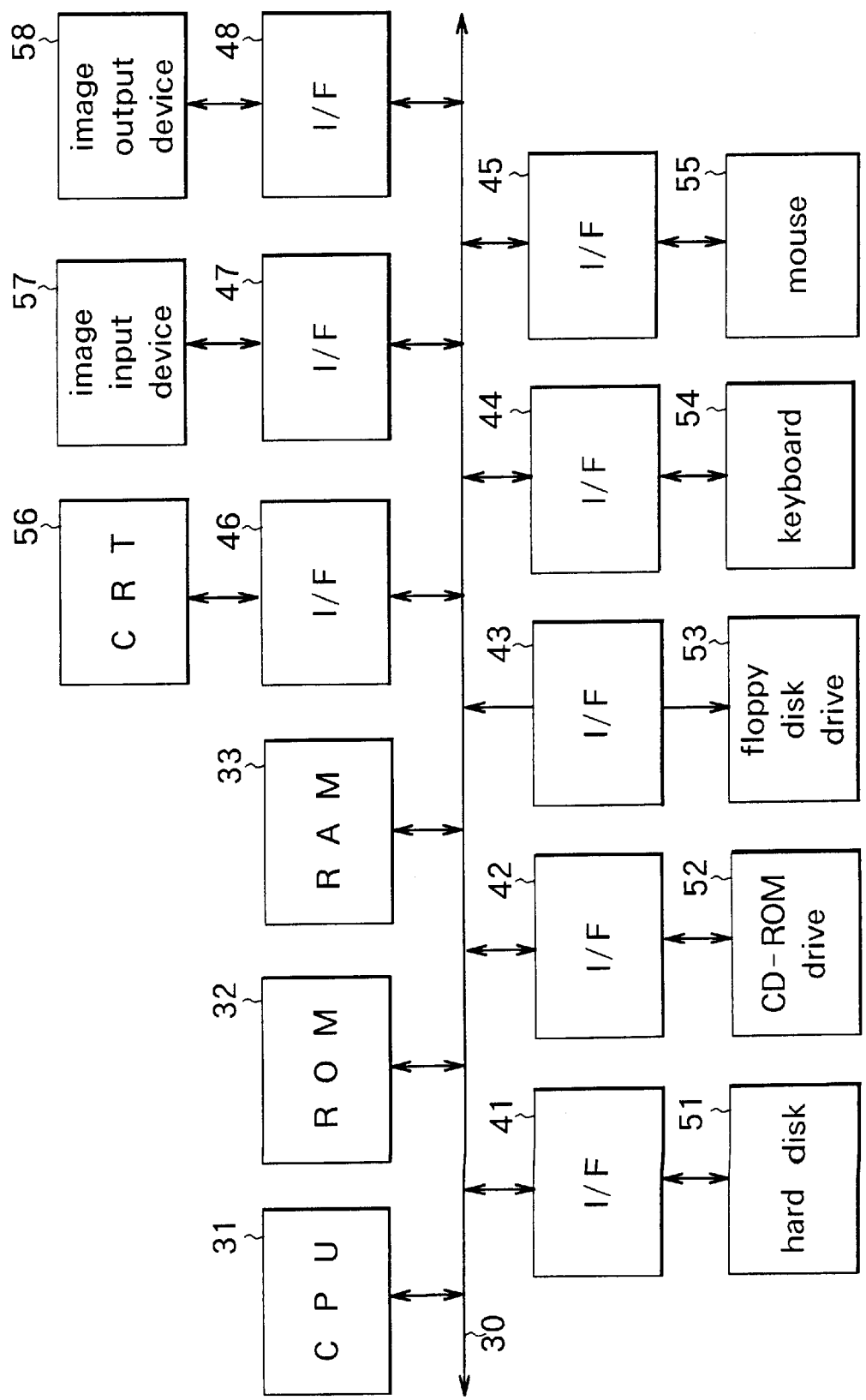
FIG. 10 is a block diagram of the image processing apparatus of the second embodiment of the invention.
Figure 11:
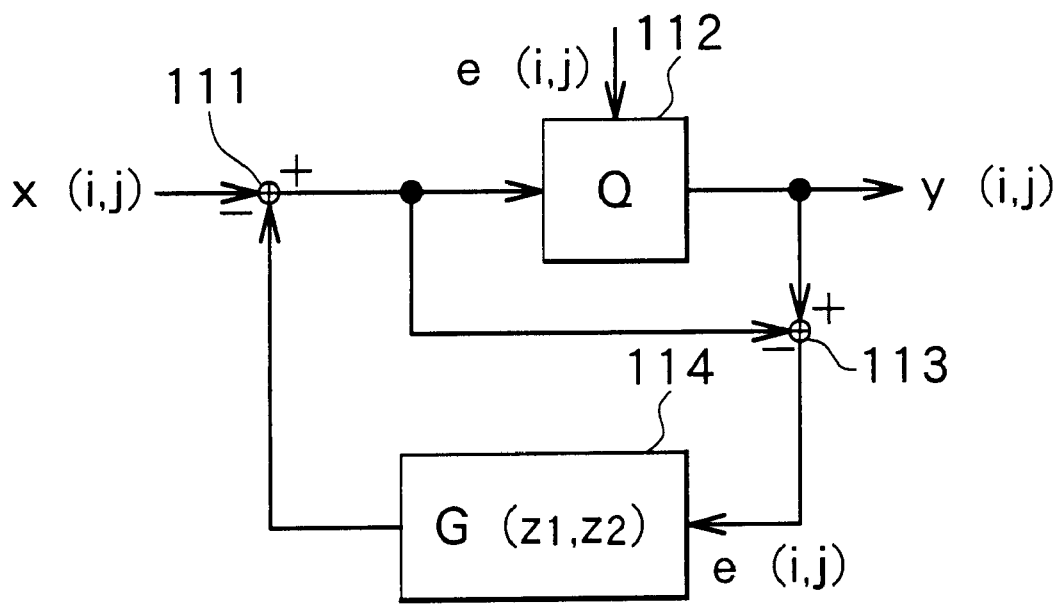
FIG. 11 is a block diagram of a conventional image processing apparatus for implementing the general error diffusion processing.

FIG. 10 is a block diagram of an image processing apparatus of a second embodiment of the invention. The embodiment is an example of implementation of a function similar to that of the image processing apparatus of the first embodiment in a form of software using a computer.

The image processing apparatus of the embodiment using a computer comprises a central processing unit (CPU) 31, read only memory (ROM) 32 and random access memory (RAM) 33, each interconnected to one another through a bus 30. The image processing apparatus further comprises a hard disk 51, a CD-ROM drive 52, a floppy disk drive 53, a keyboard 54, a mouse 55 and a cathode-ray tube (CRT) 56, each connected to the bus 30 through interfaces 41 to 46. The image processing apparatus further comprises an interface 47 for connecting an image input device 57 to the bus 30 and an interface 48 for connecting an image output device 58 to the bus 30.

The image input device 57 may be any of an image scanner, a digital camera, a video camera and so on. The image output device 58 may be any of a printer, a liquid crystal display and so on.

In the image processing apparatus of the embodiment, the CPU 31 performs the function of the first error diffusion processing section 10 and the second error diffusion processing section 20 in FIG. 1. This is achieved by the CPU 31 executing an application program stored in any of the hard disk 51, a CD-ROM driven by the CD-ROM drive 52 and a floppy disk driven by the floppy disk drive 53 with the RAM 33 as a work area.

Through the function implemented as described above, the image processing apparatus of the embodiment performs two steps of error diffusion processing similar to that of the first embodiment on image data inputted by the image input device 57 or image data made in the image processing apparatus (computer). An image data output of reduced gradation levels is thus produced to be outputted to the image output device 58.

Other operations and effects of the embodiment are similar to those of the first embodiment.

The present invention is not limited to the embodiments described so far but may be practiced in still other ways within the scope of the invention. For example, the quantization levels, the number of quantization levels, the filter characteristics and so on are those for illustration purposes and may be determined depending on a mode of application of the present invention. The invention is effective for reducing gradation levels of image data to be outputted to an ink-jet printer capable of representing multiple levels with multiple-density ink or dot-diameter variations, a fusing thermal transfer printer, a thermo-autochrome printer, a display of fewer gradation levels and so on. In addition, the invention is also effective for reducing gradation levels of image data for lessening a load on image processing and storage of image data.

According to the image processing method of the invention and the image processing apparatus of the invention, as described so far, a two step error diffusion processing of different quantization levels is performed on the image input data. An image data output with reduced gradation levels is thus obtained. As a result, a high-quality image with a uniform texture and reduced roughness is obtained through the multiple-level error diffusion processing.

In the preferred embodiment, the quantization levels of the first stage of error diffusion processing are determined to be a value between each neighboring two of the quantization levels of the second stage of error diffusion processing, the minimum level of the image input data and the maximum level of the image input data. As a result, uniform quantization errors are achieved over the all the gradation levels of the image input data.

Further, the modulation characteristics for quantization errors are different between the first and second stages of error diffusion processing. As a result, interference is prevented between quantization errors produced in the first stage of error diffusion processing and those produced in the second stage. An image of higher quality is thus achieved.

Lastly, the modulation characteristic for quantization errors of the second stage of error diffusion processing is determined so that gains are higher in low frequencies, compared to the first stage. An image with a more uniform texture is thus obtained.

Although the present invention has been shown and described with respect to preferred embodiments, various changes and modifications are deemed to lie within the spirit and scope of the invention as claimed.

What is claimed is:

1. An image processing method comprising:
   a first error diffusion processing step of performing error diffusion processing of quantization levels of three or above on image input data for producing a first error diffusion output wherein the image input data is quantized based on the quantization levels of three or above and a quantization error produced through the quantization is modulated so that the frequency of the error is higher than that before the modulation is performed; and
   a second error diffusion processing step of performing error diffusion processing of quantization levels of three or above on the first error diffusion output for producing image output data wherein the first error diffusion output is quantized based on the quantization levels of three or above including a level different from the quantization levels of the first error diffusion processing step and a quantization error produced through the quantization is modulated so that the frequency of the error is higher than that before the modulation is performed.

2. An image processing method according to claim 1 wherein the quantization levels of three or above of the first error diffusion processing step are determined to be a value between each neighboring two of the quantization levels of the second error diffusion processing step, a minimum level of the image input data and a maximum level of the image input data.

3. An image processing method according to claim 1 wherein the first error diffusion processing step and the second error diffusion processing step perform the modulation with modulation characteristics different from each other on the quantization error so that the frequencies of the errors are higher than those before the modulation is performed.

4. An image processing method according to claim 3 wherein the modulation characteristic for the quantization error of the second error diffusion processing step provides higher gains in a low frequency band than the modulation characteristic for the quantization error of the first error diffusion processing step.

5. An image processing apparatus comprising:
  a first error diffusion processing section having a first quantization means for quantizing image input data based on quantization levels of three or above and a first error modulation means for modulating a quantization error produced through the quantization performed by the first quantization means so that the frequency of the error is higher than that before the modulation is performed, and performing error diffusion processing of the quantization levels of three or above on the image input data using the first quantization means and the first error modulation means for producing an output and
  a second error diffusion processing section having a second quantization means for quantizing the output of the first error diffusion processing section based on quantization level of three or above including a level different from the quantization levels of the first quantization means and a second error modulation means for modulating a quantization error produced through the quantization performed by the second quantization means so that the frequency of the error is higher than that before the modulation is performed, and performing error diffusion processing of quantization levels of three or above on the output of the first error diffusion processing section using the second quantization means and the second error modulation means for producing image output data.

6. An image processing apparatus according to claim 5 wherein the quantization levels of three or above of the first quantization means are determined to be a value between each neighboring two of the quantization levels of the second quantization means, a minimum level of the image input data and a maximum level of the image input data.

7. An image processing apparatus according to claim 5 wherein the first and second error modulation means perform the modulation with modulation characteristics different from each other on the quantization error so that the frequency of the error is higher than that before the modulation is performed.

8. An image processing apparatus according to claim 7 wherein the modulation characteristic of the second error modulation means provides higher gains in a low frequency band than the modulation characteristic of the first error modulation means.

9. An image processing apparatus according to claim 5 wherein the second error diffusion processing section outputs the image data output to an image output device.

* * * * *